UNITED STATES PATENT OFFICE.

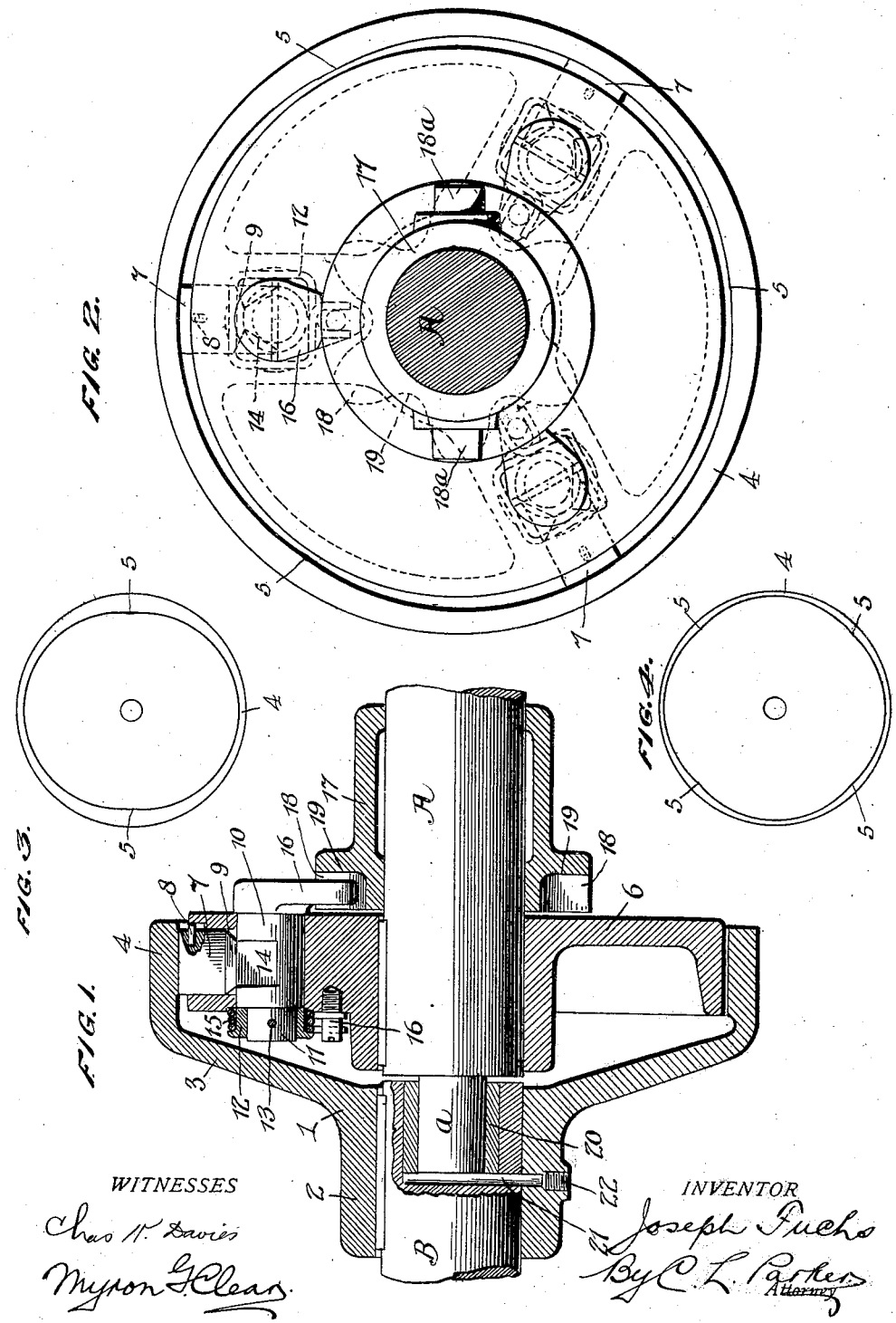

JOSEPH FUCHS, OF CINCINNATI, OHIO.

FRICTION-CLUTCH.

No. 888,703.      Specification of Letters Patent.      Patented May 26, 1908.

Application filed January 24, 1908. Serial No. 412,469.

*To all whom it may concern:*

Be it known that JOSEPH FUCHS, a citizen of United States, residing at Cincinnati, in the county of Hamilton and State of Ohio, has invented certain new and useful Improvements in Friction-Clutches, of which the following is a specification.

My invention relates to a friction clutch adapted for use in connection with pulley shafts or two part shafts similar to the one illustrated, and my invention particularly contemplates the provision of a simple and inexpensive construction which may be readily and quickly clutched or engaged, and which will be positive and unfailing in its action.

My invention further and specifically resides in the following features of construction, arrangement and operation, to be hereinafter described with reference to the accompanying drawings forming a part of this specification, in which like numerals are used to designate like parts throughout the several figures, and in which Figure 1 is a central, longitudinal sectional view taken through my improved device. Fig. 2 is an end elevation thereof. Fig. 3 is a diagrammatic end view of the driven shaft bush illustrating the eccentrically cut internal surface thereof adapted for use when two clutching elements are employed, and Fig. 4 is a similar view illustrating an internal surface to be used when four elements are employed.

In the accompanying drawings A represents the driving shaft having a reduced axial extension $a$, fitting within and rotating within an axial bore in the end of the driven shaft B, concentrically alined with said driving shaft, A.

In the practical embodiment of my invention, I have provided the end of the driven shaft, B, abutting the driving shaft A, with a friction bush 1, comprising a sleeve portion 2, keyed upon said shaft and an enlarged drum portion 3 terminating in a circular flange, 4, concentric with the driving and driven shafts, A and B, respectively. The external surface of the flange 4, may receive a pulley to drive adjacent mechanism if desired, the internal surface thereof being cut eccentrically thereto, as shown at 5, in Figs. 2, 3, and 4, in order to form a number of enlargements to receive and hold a corresponding number of clutching elements.

The driving shaft A, is provided with a bush 6, keyed thereto, within the drum portion 3, of the bush 1, and provided with a plurality of radially extending slots cut in its peripheral edge and adapted to receive clutching elements in the form of sliding plugs 7, adapted to be projected outwardly therefrom, into frictional engagement with the internal surface of the flange 4, said plugs 7 being provided with projecting pins 8, engaging in ways in the material of the bush 6. The plug 7, I provided with centrally flat portions at their lower ends and with inclined portions 9, extending from said centrally flat portion to the sides thereof. The bush 6, is provided with transverse circular openings at the base of said radial openings holding the plugs 7, through which transverse openings are rotatively mounted, short locking shafts 10 provided with reduced inner ends 11, having a flange collar 12 surrounding the same and locked thereto by means of a taper pin 13, said shafts being provided with a flattened upper surface and with inclined flattened surfaces 14 on either side of said flattened upper surface. The flattened upper surface of the short shafts 10 are normally held in engagement with the centrally flat portions of the lower ends of the plugs 7, by means of a spring 15, coiled about the collar 12, and having its ends engaging upon opposite sides of a threaded pin 16, secured within a small threaded opening in the bush 6. On their outer ends the short shafts 10, are provided with tapering cranks 16, by which said shafts may be locked to present one of their inclined flattened services 14 beneath their bush 7, whereby said bush will be free to slide inwardly as the same follows the irregularly curved internal services of the flange 4. For this purpose I provided the driving shaft A with a sliding sleeve 17, provided with bearings 18[a], for moving the same and holding the same from rotation with said shaft A. The sleeve 17, is provided upon its end adjacent the bush 6, with a plurality of radially extending projections 18, having rounded outer ends and providing recesses 19, therebetween. Thus, when the sleeve 17 is moved to the position shown in Fig. 1, in which the crank 16 of the shafts 10 will engage within certain of the recesses 19, the rotation of the bush 6, will cause said cranks 16, to strike the rounded projections 18, whereby said cranks 16, will be moved angularly, rocking the shafts 10 and presenting one of their inclined flattened surfaces 14 beneath the plugs 7. The device will thus be unclutched and the driving shaft A, will rotate without actuation to the driven shaft B, inasmuch as the bore of said shaft B, is provided with an anti-friction ring 20, surrounding the reduced end *a*, of said driven shaft, and with an oil conducting opening 21, corresponding therethrough and from the sleeve portion 2 of the bush 1, at which sleeve portion said opening 21 is closed by a secure plug 22.

The device is normally clutched by reason of the fact that the shafts 10 are held by the spring 15, with their upper flattened surfaces beneath the plug 7, thus preventing the inward movement of said plugs and causing the same to bind against the internal surface of the flange 4, adjacent the enlargements thereon as previously described.

Having fully described my invention, what I claim is:

1. In a clutch of the character described, the combination of the driving and driven shafts, a friction bush carried by one of said shafts having a circular flange, and constituting the outside bush, a friction bush carried by the other of said shafts extending within said circular flange and constituting the interior bush, radially slidable friction plugs mounted in slots in said interior bush and for engagement with the internal surface of said flange, circular locking shafts rotatively mounted at the bases of said plugs to force the same outwardly and provided with opposing flattened portions in circular alinement with said plugs, and means to simultaneously rotate said shafts to bring one of the flattened portions thereof beneath the said plugs, substantially as described.

2. In a clutch of the character described, the combination of the driving and driven shafts, a friction bush carried by one of said shafts having a circular flange provided with an eccentrically cut internal surface and constituting the outside bush, a friction bush carried by the other of said shafts extending within said circular flange and constituting the interior bush, radially slidable friction plugs mounted in slots in said interior bush and for engagement with the internal surface of said flange, circular locking shafts rotatively mounted at the bases of said plugs to force the same outwardly and provided with opposing flattened portions in circular alinement with said plugs, and means to simultaneously rotate said shafts to bring one of the flattened portions thereof beneath the said plugs, substantially as described.

3. In a clutch of the character described, the combination of the driving and driven shafts, a friction bush carried by one of said shafts having a circular flange and constituting the outside bush, a friction bush carried by the other of said shafts, extending within said circular flange and constituting the interior bush, radially slidable friction plugs mounted in slots in said interior bush and for engagement with the internal surface of said flange, circular locking shafts rotatively mounted at the bases of said plugs to force the same outwardly and provided with opposing flattened portions in circular alinement with said plugs, means to hold said shafts in position to force said plugs outwardly, and means to simultaneously rotate said shafts to bring one of the flattened portions thereof beneath the said plugs, substantially as described.

4. In a clutch of the character described, the combination of the driving and driven shafts, a friction bush carried by one of said shafts having a circular flange provided with an eccentrically cut out internal surface and constituting the outside bush, a friction bush carried by the other of said shafts extending within said circular flange and constituting the interior bush, radially slidable friction plugs mounted in slots in said interior bush and for engagement with the internal surface of said flange, circular locking shafts rotatively mounted at the bases of said plugs to force the same outwardly and provided with opposing flattened portions in circular alinement with said plugs, means to hold said shafts in position to force said plugs outwardly, and means to simultaneously rotate said shafts to bring one of the flattened portions thereof beneath the said plugs, substantially as described.

In testimony whereof I affix my signature in presence of two witnesses.

JOSEPH FUCHS.

Witnesses:
AMOS P. FOSTER,
GLENDENNING B. GROESBECK.